(12) United States Patent
Park (10) Patent No.: US 7,613,090 B2
(45) Date of Patent: Nov. 3, 2009

(54) APPARATUS AND METHOD FOR CONTROLLING TILT IN OPTICAL DISC DEVICE

(75) Inventor: Jun Kyung Park, Suwon-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 521 days.

(21) Appl. No.: 11/131,224

(22) Filed: May 18, 2005

(65) Prior Publication Data
US 2005/0259544 A1 Nov. 24, 2005

(30) Foreign Application Priority Data
May 19, 2004 (KR) ........................ 10-2004-0035710
May 19, 2004 (KR) ........................ 10-2004-0035711

(51) Int. Cl.
*G11B 7/00* (2006.01)
(52) U.S. Cl. ................ 369/53.19; 369/53.15; 369/44.32
(58) Field of Classification Search .............. 369/53.19, 369/53.18, 47.33, 44.32, 44.41, 13.05, 13.14, 369/53.15
See application file for complete search history.

(56) References Cited

U.S. PATENT DOCUMENTS

| 5,001,690 | A | | 3/1991 | Kamiya et al. | |
|---|---|---|---|---|---|
| 5,898,654 | A | * | 4/1999 | Shimada et al. | ........... 369/44.32 |
| 6,160,772 | A | * | 12/2000 | Muramatsu | .............. 369/53.19 |
| 6,363,039 | B2 | | 3/2002 | Hayashi et al. | |
| 7,116,510 | B2 | | 10/2006 | Yamamoto | |
| 7,218,588 | B2 | * | 5/2007 | Arakawa | ................. 369/53.19 |
| 2003/0099171 | A1 | * | 5/2003 | Ito | ........................... 369/53.19 |
| 2003/0142598 | A1 | * | 7/2003 | Chou et al. | .............. 369/53.19 |
| 2003/0210627 | A1 | * | 11/2003 | Ijtsma et al. | ............. 369/53.18 |
| 2004/0057353 | A1 | | 3/2004 | Ohno et al. | |
| 2004/0090619 | A1 | | 5/2004 | Choi | |
| 2005/0007904 | A1 | * | 1/2005 | Ishiyama et al. | ......... 369/53.19 |
| 2005/0025011 | A1 | * | 2/2005 | Gabryjelski | .............. 369/47.33 |
| 2005/0259544 | A1 | | 11/2005 | Park | |
| 2005/0259545 | A1 | * | 11/2005 | Yun | ....................... 369/53.19 |

FOREIGN PATENT DOCUMENTS

CN 1484228 3/2004

OTHER PUBLICATIONS

Chinese Office Action dated Mar. 21, 2008.

* cited by examiner

*Primary Examiner*—Hoa T Nguyen
*Assistant Examiner*—Kim-Kwok Chu
(74) *Attorney, Agent, or Firm*—Ked & Associates LLP (57) ABSTRACT

Embodiments of a method and apparatus for controlling tilt in an optical disc device such as a DVD recorder can select dynamic tilt control mode if the current operating mode of the device is record mode, and select static tilt control mode if the current operating mode is play mode thereby enabling tilt control selected for the current operating mode. Further, the device can maintain dynamic tilt control mode when data recording is resumed after being suspended, which enables the device to quickly perform tilt control preferred for the current optical pickup location. The device also can check the type of optical disc and whether a host supports defect management to select a preferred tilt control mode.

15 Claims, 10 Drawing Sheets

FIG. 1
(Related Art)

*Static Tilt Control*

FIG. 2
(Related Art)

*Dynamic Tilt Control*

FIG. 3
(Related Art)

Defect Management

APPARATUS AND METHOD FOR CONTROLLING TILT IN OPTICAL DISC DEVICE

BACKGROUND OF THE INVENTION

1. Field of the Invention

The present invention relates to an apparatus and method for controlling tilt in an optical disc device.

2. Background of the Related Art

Optical discs belonging to the CD and DVD families have been widely commercialized, and optical discs belonging to the BD (Blue-ray Disc) family are expected to be commercialized in the near future. The CD family includes optical discs such as a CD-ROM (a read-only CD), a CD-R (a write-once CD) and a CD-RW (a rewritable CD), and the DVD family includes optical discs such as a DVD-ROM (a read-only DVD), a DVD-R (a write-once DVD) and a DVD-RW (a rewritable DVD).

Compared to CDs, DVDs have an insufficient optical margin since their track pitch is narrow and an objective lens provided in an optical pickup for DVDs has a high numerical aperture (NA). Thus, there is a need to perform a tilt control operation for controlling tilt of the objective lens, for example, by moving inner and outer sides of the objective lens vertically in opposite directions so that the recording surface of the optical disc is parallel to the objective lens.

If an optical disc is loaded in an optical disc device such as a DVD recorder, the device performs focus and tracking servo operations, and also detects the optimal tilt offset value while varying the tilt of the objective lens. By controlling the tilt of the objective lens according to the detected tilt offset value, the optical disc device enables the recording surface of the optical disc to be parallel to the objective lens, so that data is correctly read from or written to the disc.

Figure 1:
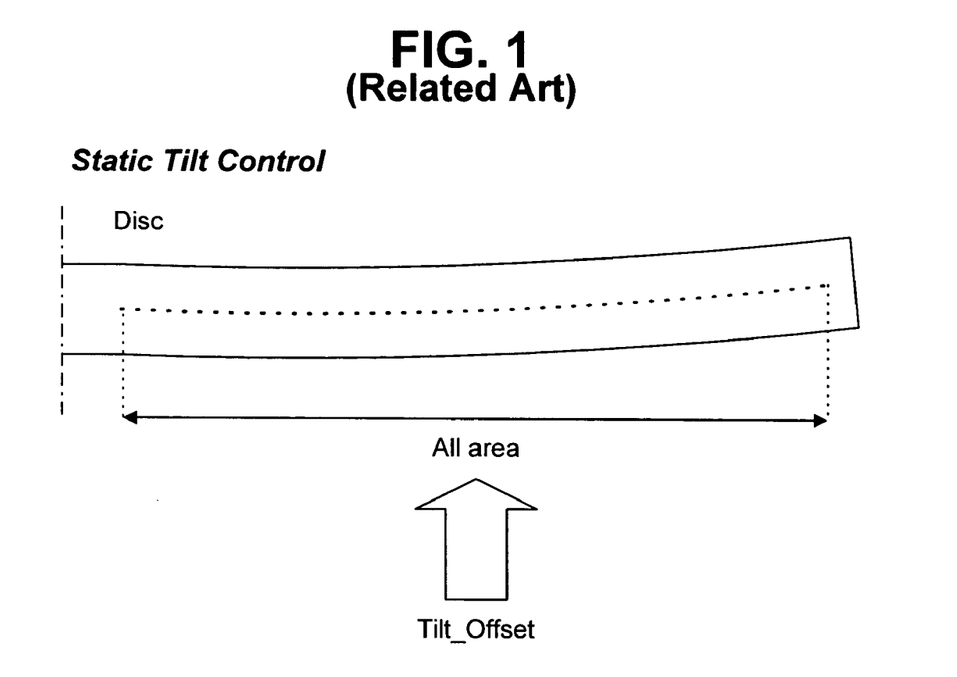
FIG. 1 is a diagram illustrating a related art tilt control method when a static tilt control mode is selected.

There are two tilt control modes, that is, a static tilt control mode and a dynamic tilt control mode. In the static tilt control mode, as shown in FIG. 1, an optimal tilt offset value (Tilt_Offset) is detected for an inner peripheral area (for example, a lead-in area) of an optical disc, and the detected tilt offset value is commonly used for all areas of the optical disc.

Figure 2:
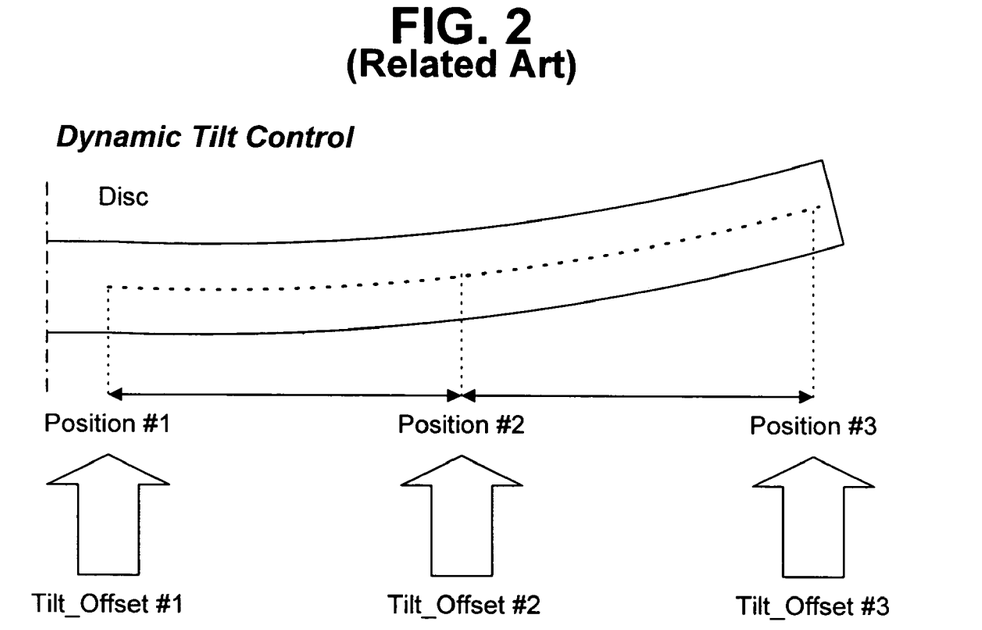
FIG. 2 is a diagram illustrating a related art tilt control method when a dynamic tilt control mode is selected.

In the dynamic tilt control mode, as shown in FIG. 2, optimal tilt offset values (Tilt_Offset #1, Tilt_Offset #2, and Tilt_Offset #3) are respectively detected for an inner peripheral area, a middle area, and an outer peripheral area of an optical disc. The detected optical tilt offset values are selectively used for the inner, middle and outer areas of the optical disc.

However, as described above the related art has various disadvantages. For example, if data is recorded on a write-once optical disc or a recordable optical disc with the static tilt control mode activated, tilt control optimal for the skew of the optical disc, which gradually increases towards the outer perimeter of the optical disc, is not performed since the static tilt control mode still uses a tilt offset value detected for an inner peripheral area of the optical disc when data is recorded on an outer peripheral area of the optical disc.

In addition, if the user requests reproduction of data recorded on an optical disc at a specific position thereof while data playback is performed with the dynamic tilt control activated for the optical disc, a tilt offset value corresponding to the specific position must be selectively used while accessing the specific position. An abrupt change in the tilt offset value in this procedure can cause a fatal error in focus or tracking servo operations.

Figure 3:
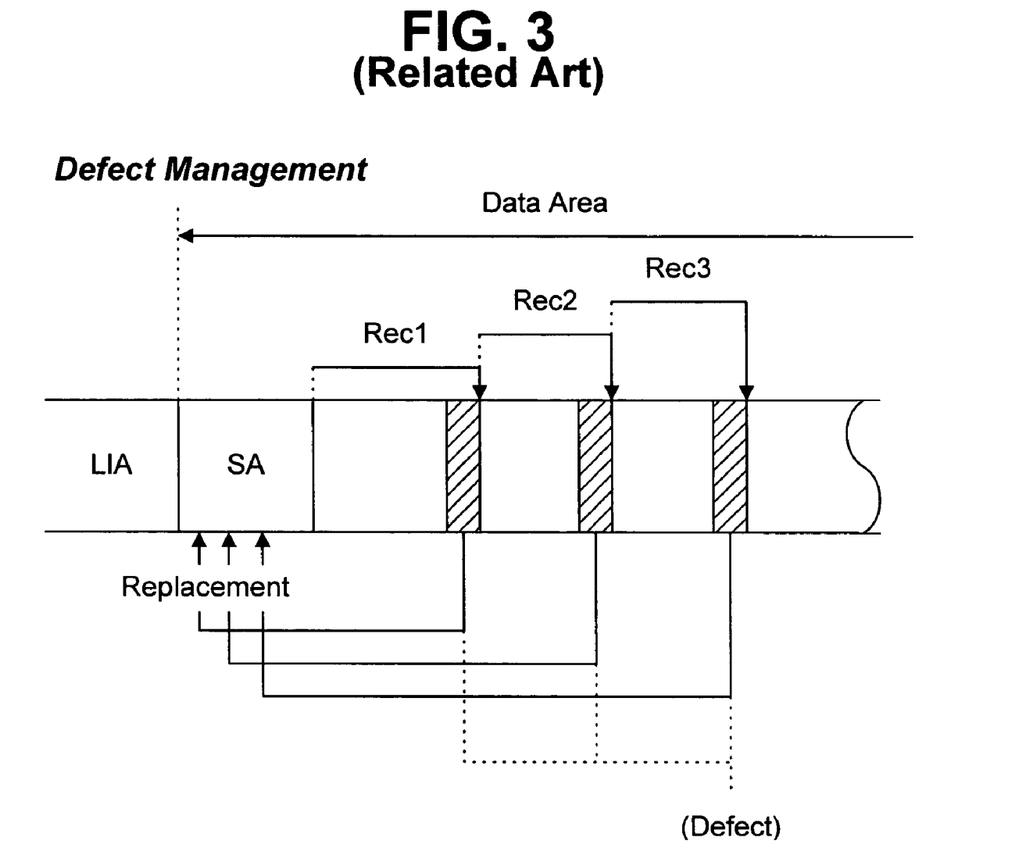
FIG. 3 is a diagram illustrating a related art defect management operation.

Further, as shown in FIG. 3 the following problem is caused if the dynamic tilt control mode is used while writing data on a rewritable optical disc, such as a DVD-RAM or a BD-RE (BD-rewritable), which is subject to defect management. To rewrite data that was erroneously written in a defect area of the disc into a spare area (SA) of the disk, a tilt offset value (for example, Tilt_Offset #1 or #2) corresponding to the current position of an optical pickup is selectively used while performing random access to the spare area and the defect area repeatedly and alternatively. An abrupt change in the tilt offset value in this procedure causes a fatal error in focus or tracking servo operations.

The above references are incorporated by reference herein where appropriate for appropriate teachings of additional or alternative details, features and/or technical background.

SUMMARY OF THE INVENTION

An object of the invention is to solve at least the above problems and/or disadvantages or to provide at least the advantages described hereinafter.

Another object of the present invention is to provide an apparatus and method for controlling tilt in an optical disc device, which enables tilt control corresponding to a current operating mode of an optical disc device such as a DVD recorder.

Another object of the present invention to provide an apparatus and method for controlling tilt in an optical disc device that enables tilt control corresponding to a current location of an optical pickup even when data recording operation is resumed after being suspended.

Another object of the present invention to provide an apparatus and method for controlling tilt in an optical disc device that performs tilt control according to the type of optical disc loaded in the device and depending on whether a host connected with the device supports defect management.

To achieve at least the above objects or advantages in a whole or in part and in accordance with one aspect of the present invention as embodied and broadly described herein there is provided a method for controlling tilt in an optical disc device, the method includes checking whether current operating mode of the optical disc device is a first mode or a second mode and selecting a tilt control mode from a first tilt control mode and a second tilt control mode according to the current mode.

To further achieve at least the above objects or advantages in a whole or in part and in accordance with another aspect of the present invention, as embodied and broadly described herein there is provided an apparatus for controlling tilt in an optical disc device, the apparatus includes a controller configured to select a dynamic tilt control mode when current operating mode of the optical disc device is a record mode, and select a static tilt control mode when the current operating mode of the optical disc device is a play mode and a servo unit configured to control tilt of a lens based on the selected tilt control mode.

To further achieve at least the above objects or advantages in a whole or in part and in accordance with still another aspect of the present invention, as embodied and broadly described herein there is provided a method for controlling tilt in an optical disc device, the method includes activating dynamic tilt control mode in a record mode, determining a cause for pausing the record mode using the dynamic tilt control mode and maintaining the dynamic tilt control mode or switching to a static tilt control mode according to the determined cause.

To further achieve at least the above objects or advantages in a whole or in part and in accordance with yet another aspect of the present invention, as embodied and broadly described herein there is provided a method for controlling tilt in an optical disc device, the method includes determining whether an optical disc in the optical disc device is subject to defect management and selecting a first tilt control mode or a dynamic tilt control mode according to the determination.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 4:
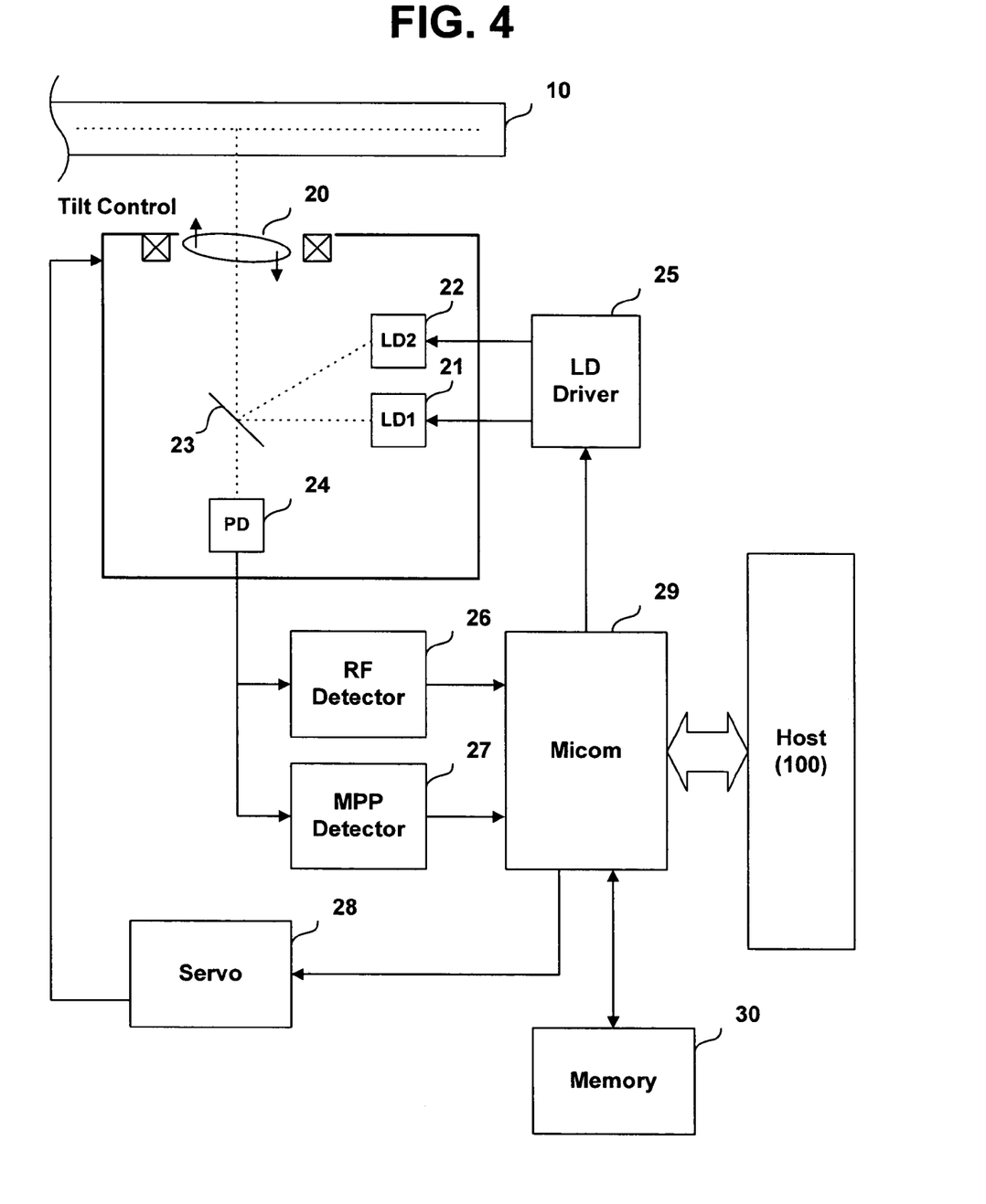
FIG. 4 is a block diagram of an embodiment of an optical disc device according to the invention.

FIG. 4 is a block diagram showing an optical disc device to which an embodiment of the invention is applied. As shown in FIG. 4, the optical disc device such as a DVD recorder can include an optical pickup, which includes an objective lens 20, a laser diode 21 for DVDs, a laser diode 22 for CDs, a beam splitter 23 and a photo detector 24, an LD driver 25, an RF detector 26, an MPP (Main-beam Push Pull) detector 27, a microcomputer 29, a servo unit 28, and a memory 30. Additional laser diodes can be used.

The RF detector 26 can detect an RF signal (e.g., RF=Sa+Sb+Sc+Sd) by adding signals Sa, Sb, Sc and Sd output respectively from 4 divided areas A, B, C and D of the photo detector 24. The MPP detector 27 can detect an MPP signal (e.g., MPP=(Sa+Sb)−(Sc+Sd)) by selectively adding and subtracting the signals Sa, Sb, Sc and Sd output from the 4 divided areas of the photo detector 24.

If an optical disc (for example, a read-only optical disc) is loaded in the device, the microcomputer 29 can detect an RF signal of the optical disc using the RF detector 26 while controlling tilt of the objective lens 20 by moving inner and outer sides of the objective lens 20 vertically in opposite directions. The microcomputer 29 can detect and store a tilt control value at which the detected RF signal level is maximized or desired, as an optimal or selected tilt offset value for the loaded optical disc, in the memory 30.

If a write-once optical disc or a rewritable optical disc is inserted in the optical disc device, the microcomputer 29 can detect respective MPP signals for an inner peripheral area, a middle area and an outer peripheral area of the inserted disc using the MPP detector 27 while controlling the tilt of the objective lens 20 for each of the inner, middle and outer areas of the inserted optical disc. The microcomputer 29 can store respective tilt control values at which the detected MPP signal levels for the inner, middle and outer areas of the inserted optical disc are desired or maximized, as respective optimal tilt offset values for the inner, middle and outer areas, in the memory 30 in association with respective location information of the inner, middle and outer areas.

Figure 5:
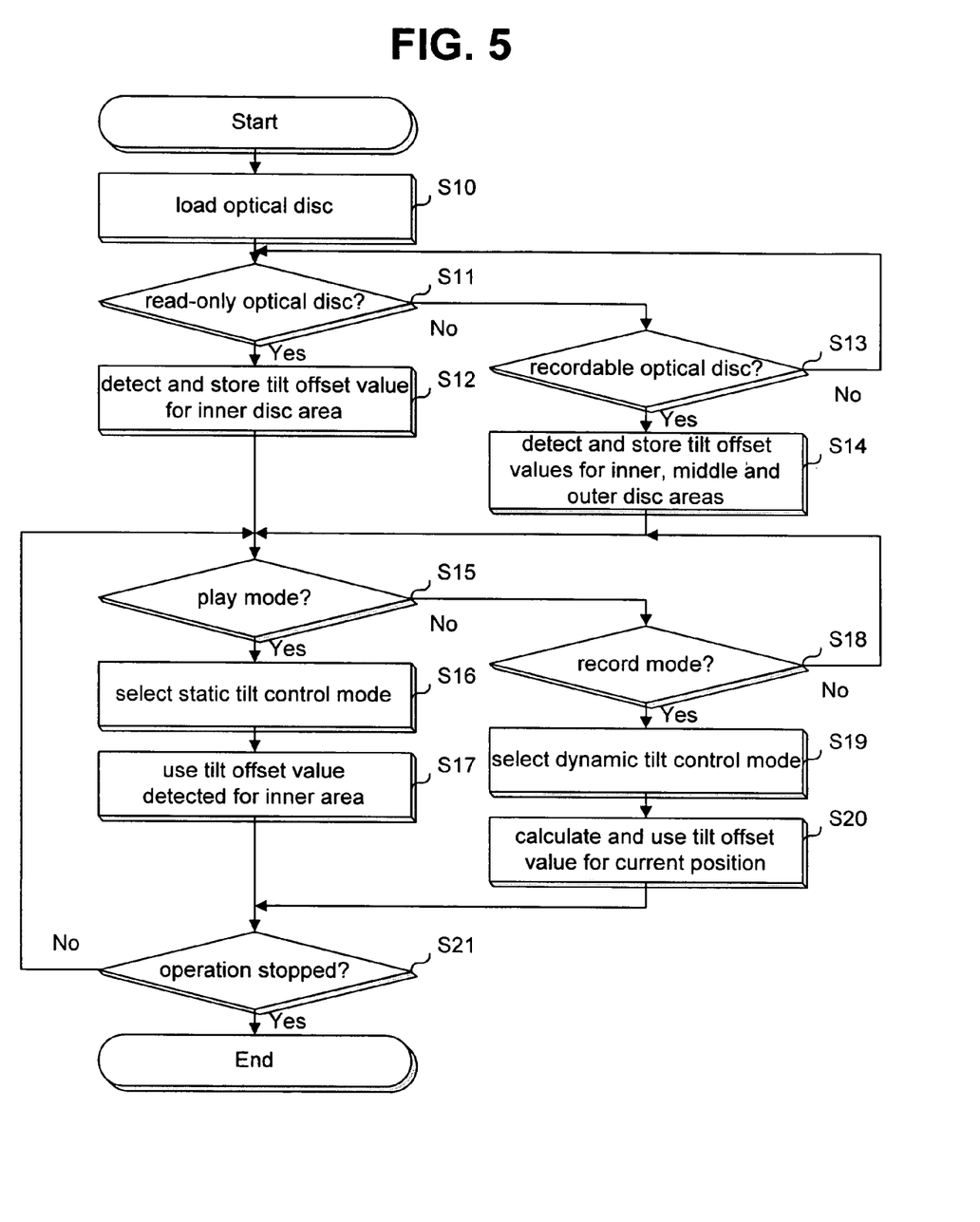
FIG. 5 is a flow chart showing an embodiment of a method for controlling tilt in an optical disc device according to the invention that uses different tilt control modes according to a current operating mode of the optical disc device.

FIG. 5 is a flow chart showing an embodiment of a tilt control method that uses different tilt control modes according to the current operating mode of the optical disc device. As shown in FIG. 5, the embodiment of a tilt control can be applied to and will be described using the embodiment of FIG. 4. However the present invention is not intended to be so limited.

As shown in FIG. 5, if an optical disc is loaded in the optical disc device (block S10), the microcomputer 29 can check whether the loaded optical disc is a read-only optical disc or a recordable optical disc. For example, if the loaded optical disc is a read-only optical disc such as a DVD-ROM (block S11), the microcomputer 29 can detect an optimal tilt offset value for an inner peripheral area (for example, a lead-in area) of the loaded optical disc, and store the detected optimal tilt offset value in the memory 30.

If the loaded optical disc is a recordable optical disc such as a DVD-R or a DVD-RW (block S13), before or after performing a power calibration, the microcomputer 29 can detect not only an optimal tilt offset value for the inner peripheral area (for example, a lead-in area) of the loaded optical disc, but also respective optimal tilt offset values for a middle area and an outer peripheral area of the loaded optical disc, and store the detected tilt offset values, together with respective location information of the inner, middle and outer areas, in the memory 30 (block S14).

At the request of the user or the like, the microcomputer 29 sets the operating mode of the optical disc device to a play mode or a record mode. For example, if the play mode is set with a read-only optical disc inserted in the device (block S15), the microcomputer 29 can select the static tilt control mode (block S16).

The microcomputer 29 then can read a tilt offset value (for example, the tilt offset value for the inner peripheral area) stored in the memory 30, and commonly use the read tilt offset value for all areas of the optical disc (block S17). Accordingly, even if the user requests reproduction of data recorded on the disc at a specific position thereof during playback of the disc, and the specific position is then accessed, a focus or tracking servo operation can be stably performed since the tilt offset value is commonly used for all areas of the disc.

Alternatively, if the record mode is determined to be set with a recordable optical disc inserted in the device (block S18), the microcomputer 29 can select the dynamic tilt control mode (block S19).

The microcomputer 29 can read the respective tilt offset values for the inner, middle and outer areas, which are stored in the memory 30, and determine the current position of the optical pickup with respect to the disc. The microcomputer 29 can calculate an optimal tilt offset value for the current position of the optical pickup through a predetermined calculation procedure, and then use the calculated offset value for tilt control (block S20).

Figure 6:
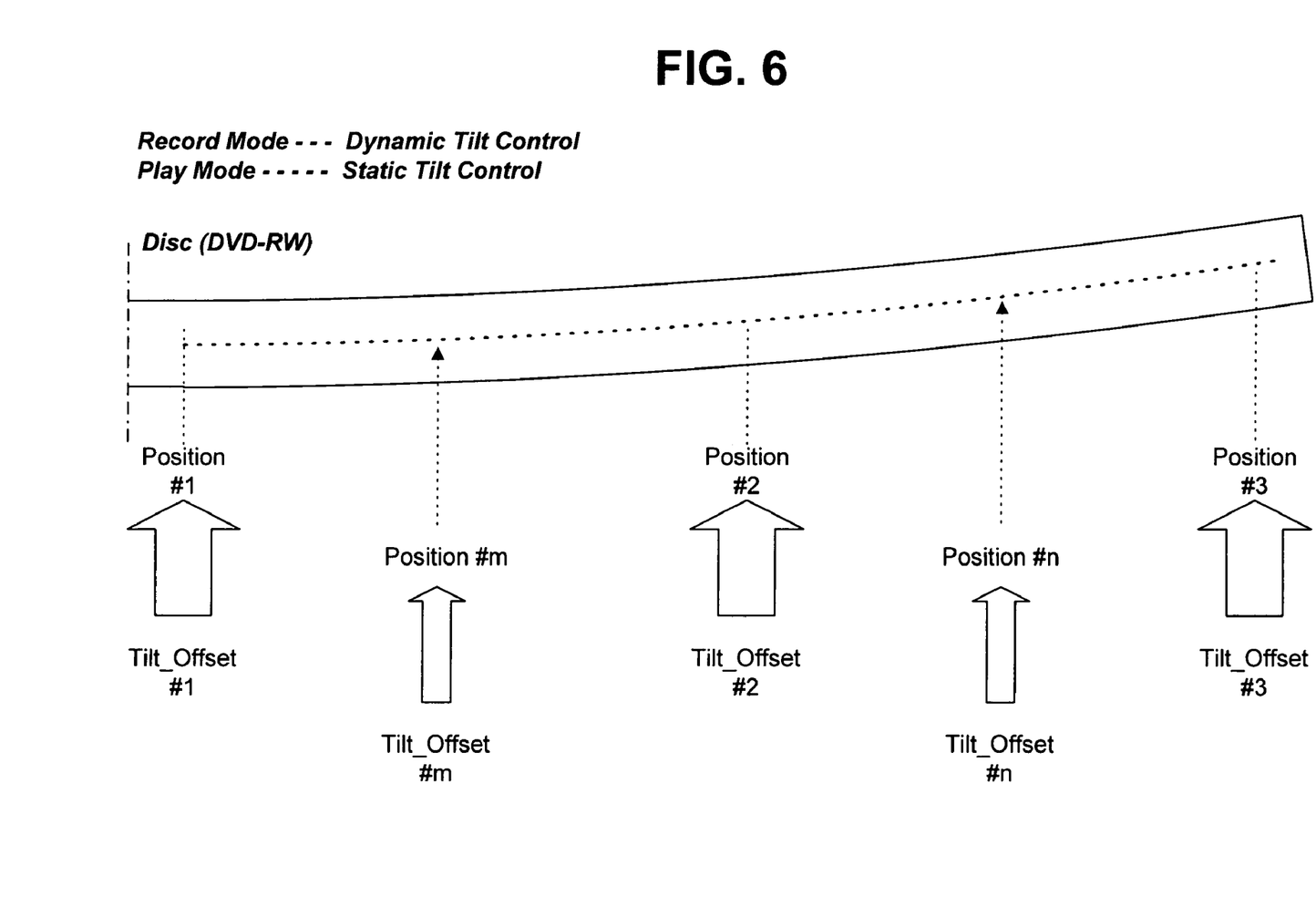
FIG. 6 is a diagram illustrating exemplary conditions where a dynamic tilt control mode or a static tilt control mode is selectively activated according to a current operating mode of the optical disc device.
Figure 7:
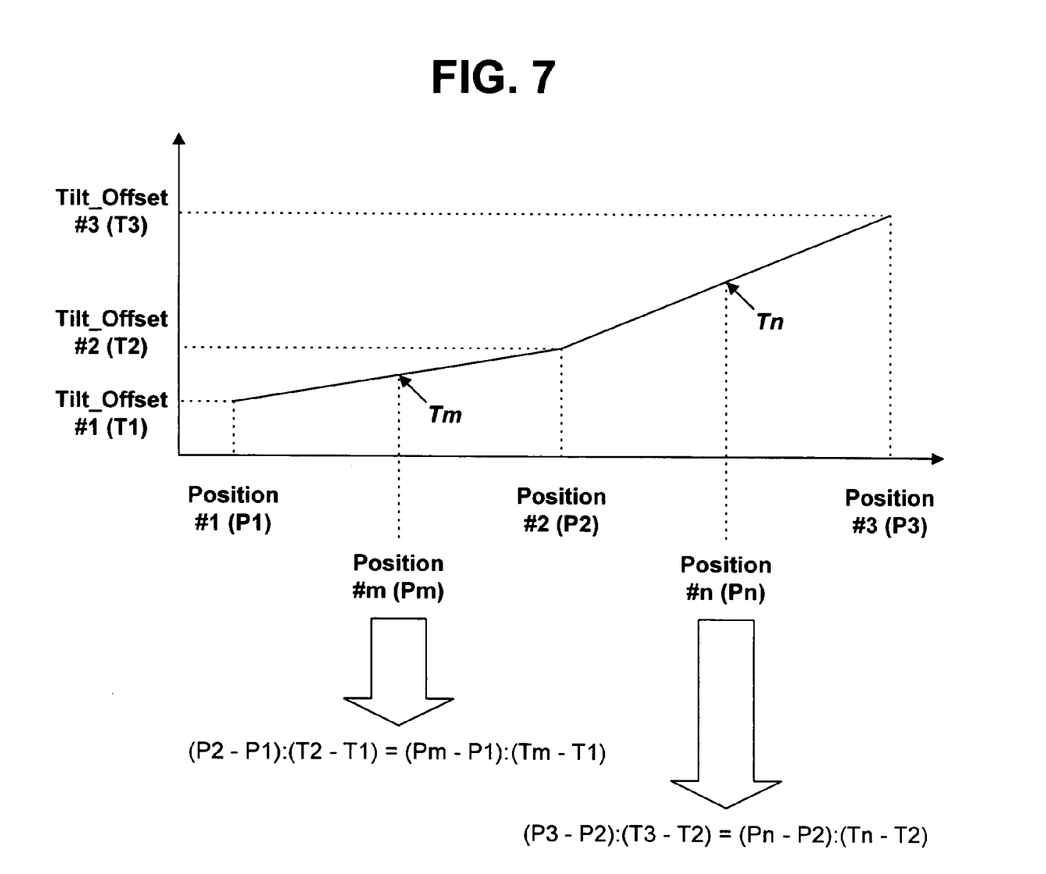
FIG. 7 is a graph illustrating exemplary operations where a tilt offset value for each position is calculated in the dynamic tilt control mode.

With reference to ATIP (Absolute Time In Pre-groove) information recorded in the form of a wobble on a rewritable DVD, the microcomputer 29 can calculate an optimal tilt offset value for each position of the disc at intervals of a predetermined time, for example, every minute which corresponds to 4500 ATIPs (e.g., 75 ATIPs=1 second). As shown in FIGS. 6 and 7, first to third tilt offset values (Tilt_Offset #1, #2 and #3) optimal or selected for first to third positions (Position #1, #2 and #3) of a rewritable DVD (for example, a DVD-RW), which correspond to an inner peripheral area, a middle area and an outer peripheral area thereof, can be stored in the memory 30. Here, let us assume that the skew of the optical disc linearly and gradually increases towards the outer perimeter of the optical disc.

The microcomputer 29 can read the ATIP information to determine the current position "Pm" of the optical pickup with respect to the disc. If the current position "Pm" of the optical pickup is between the first and second positions "P1" and "P2", the microcomputer 29 can calculate a selected or optimal tilt offset value "Tm" for the current position "Pm", based on a prescribed relationship, for example a proportional relationship "(P2−P1):(T2−T1)=(Pm−P1):(Tm−T1)" using the first and second positions "P1" and "P2" and the first and second tilt offset values "T1" and "T2".

If the current position "Pn" of the optical pickup is between the second and third positions "P2" and "P3", the microcomputer 29 can calculate a selected or optimal tilt offset value "Tn" for the current position "Pn", based on a proportional relationship "(P3−P2):(T3−T2)=(Pn−P2):(Tn−T2)" using the second and third positions "P2" and "P3" and the second and third tilt offset values "T2" and "T3".

By performing dynamic tilt control using the tilt offset value for each position calculated through the above exemplary procedure, the microcomputer 29 can enable tilt control for the skew of the optical disc, which gradually increases towards the outer perimeter of the optical disc.

If the operating mode of the optical disc device is changed from the record mode to the play mode according to one embodiment at the request of the user, the microcomputer 29 can switch the dynamic tilt control mode to the static tilt control mode, and perform tilt control based on a single tilt offset value, for example, based on the first tilt offset value detected for the inner peripheral area of the disc. Accordingly, even if the user requests reproduction of data recorded on the disc at a specific position thereof during playback of the disc, and the specific position is then accessed, focus or tracking servo operations can be stably performed.

Until the user requests that the optical disc device stop operation (block S21), the microcomputer 29 can allow the device to perform dynamic tilt control if the operating mode of the device is the record mode, and to perform static tilt control if the operating mode thereof is the play mode. From block S21, the process can selectively return to block S15.

Figure 8:
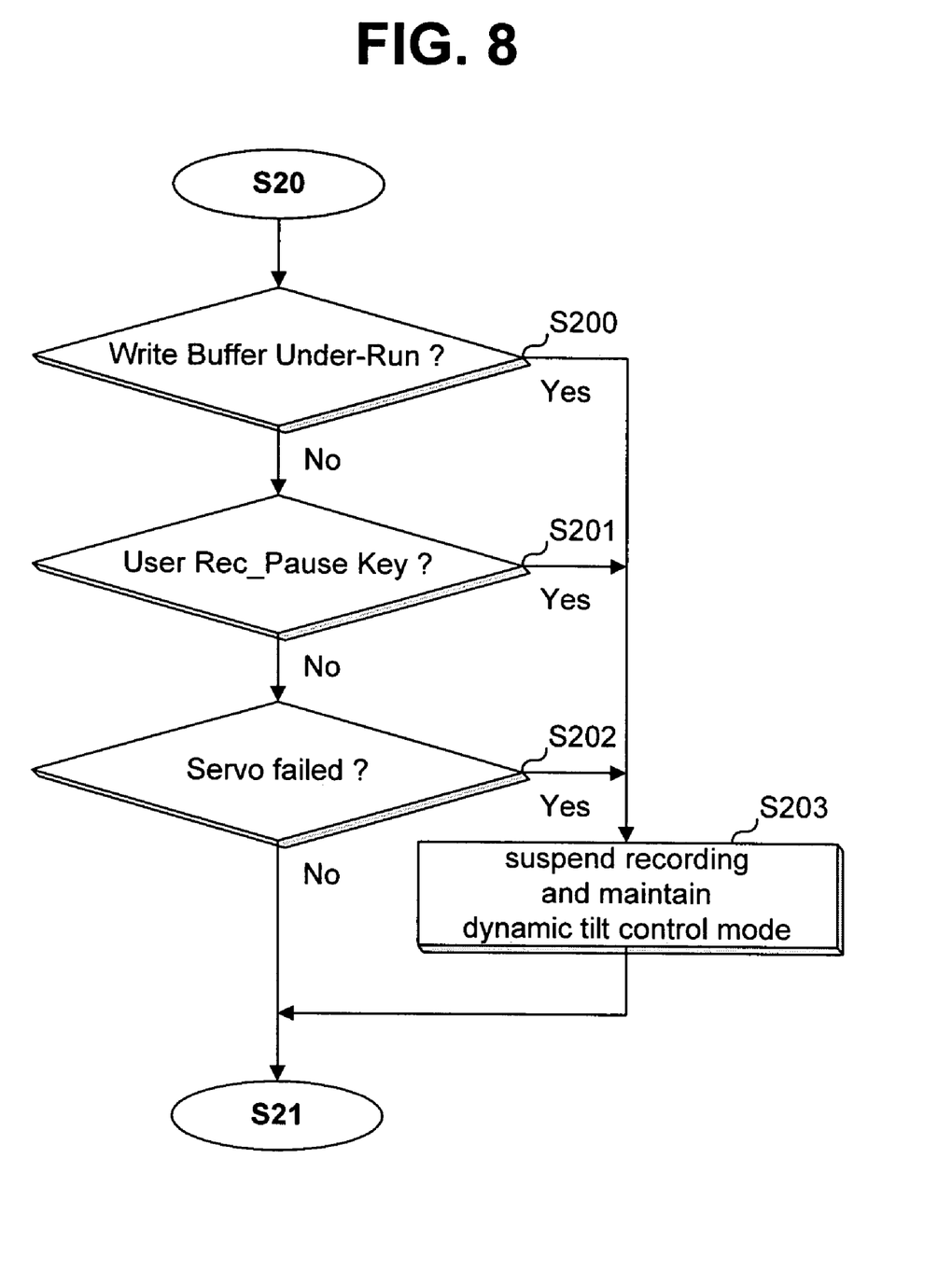
FIG. 8 is a flow chart of a procedure for maintaining the dynamic tilt control mode according to another embodiment of the present invention.

FIG. 8 shows a flowchart of another embodiment of a tilt control method. As shown in FIG. 8, while performing the dynamic tilt control with the record mode set in the device (S20), the microcomputer 29 can continuously, constantly or repeatedly check the state of a write buffer that temporarily stores data to be recorded on the rewritable optical disc 10 (e.g., DVD). For example, if a state called "Write Buffer Under-Run", in which the amount of data temporarily stored in the write buffer is smaller than a preset reference data amount occurs (block S200), the microcomputer 29 can suspend the data recording operation while maintaining the dynamic tilt control mode (block S203).

If the user inputs a record pause key (block S201) or if a focus and tracking servo operation error causes a servo failure (block S202), the microcomputer 29 can suspend the data recording operation while maintaining the dynamic tilt control mode. Accordingly, even if the suspension of recording operation is released and the recording operation is then resumed, the microcomputer 29 can efficiently perform stable tilt control by immediately using a tilt offset value optimal or selected for the current position of the optical pickup.

Figure 9:
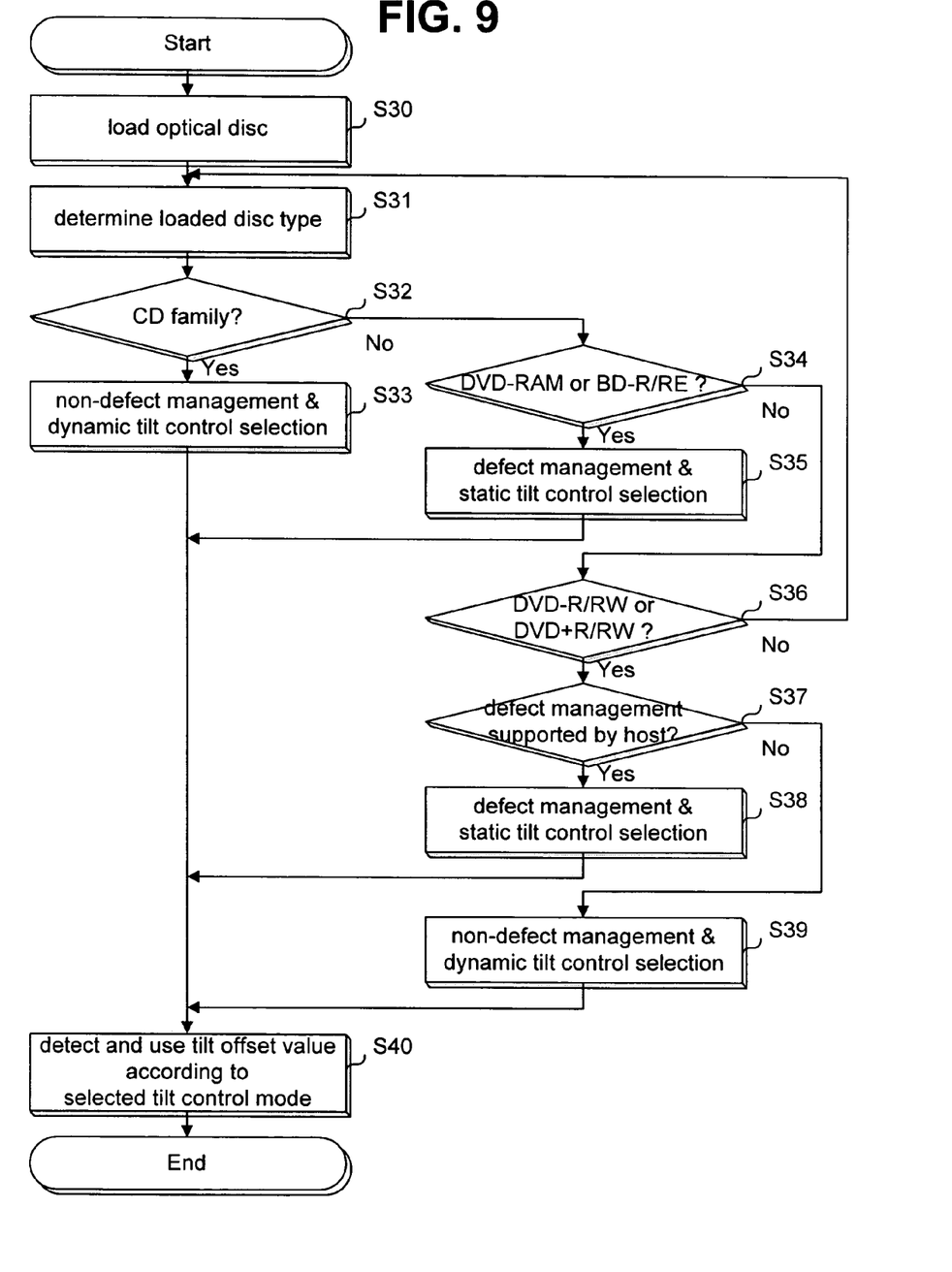
FIG. 9 is a flow chart of a method for controlling tilt in an optical disc device according to yet another embodiment of the present invention that selects different tilt control modes according to the type of optical disc and depending on whether a host supports defect management.

FIG. 9 is a flow chart showing an embodiment of a tilt control method that can use different tilt control modes according to the type of loaded optical disc and depending on whether a host connected with the device supports defect management. As shown in FIG. 9 the embodiment of a tilt control method can be applied to and will be described using the embodiment of FIG. 4. However, the present invention is not intended to be so limited.

As shown in FIG. 9, if an optical disc is loaded in the optical disc device (block S30), the microcomputer 29 can determine the type of the loaded optical disc (block S31). If the loaded optical disc belongs to the CD family (block S32), the microcomputer 29 can determine that the loaded optical disc is not subject to defect management, and then select and activate a dynamic tilt control mode to perform tilt control optimal or selected for skew of the optical disc, which for example, can gradually increase towards the outer perimeter of the optical disc (block S33).

If the loaded optical disc is determined to be a DVD-RAM, a BD-R, or a BD-RE (block S34), the microcomputer 29 can determine that the loaded optical disc is subject to defect management, and then select and activate a static tilt control mode so that stable focus and tracking servo operations are performed (block S35).

If the loaded optical disc is determined to be a DVD-R, a DVD-RW, or a DVD+RW (block S36), the microcomputer 29 can check whether the host supports defect management. For example, if a recording tool executed in the host supports defect management, the microcomputer 29 can select and activate the static tilt control mode (block S38). If the recording tool executed in the host does not support defect management, the microcomputer 29 can select and activate the dynamic tilt control mode (block S39).

Whether or not the host supports defect management can be determined, for example, through interfacing with the host when the system starts up or by a command transmitted from the host when a defect occurs. However, the present invention is not intended to be so limited.

If the static tilt control mode is selected and activated in the procedure described above, the microcomputer 29 can detect an optimal tilt offset value for an inner peripheral area (for example, a lead-in area) of the loaded optical disc, and then commonly use the detected tilt offset value for all areas of the disc. Such a process is described with reference to FIG. 1.

If the dynamic tilt control mode is selected and activated, the microcomputer 29 can detect respective tilt offset values for the inner, middle and outer areas of the loaded optical disc, and then selectively use the detected optimal tilt offset values for the inner, middle and outer areas of the loaded optical disc (block S40). Such a process is described with reference to FIG. 2.

Accordingly, embodiments according to the invention can select and activate the static or dynamic tilt control mode appropriately according to the type of optical disc inserted in the optical disc device and depending on whether or not the host supports defect management. However, the present invention is not intended to be so limited.

Figure 10:
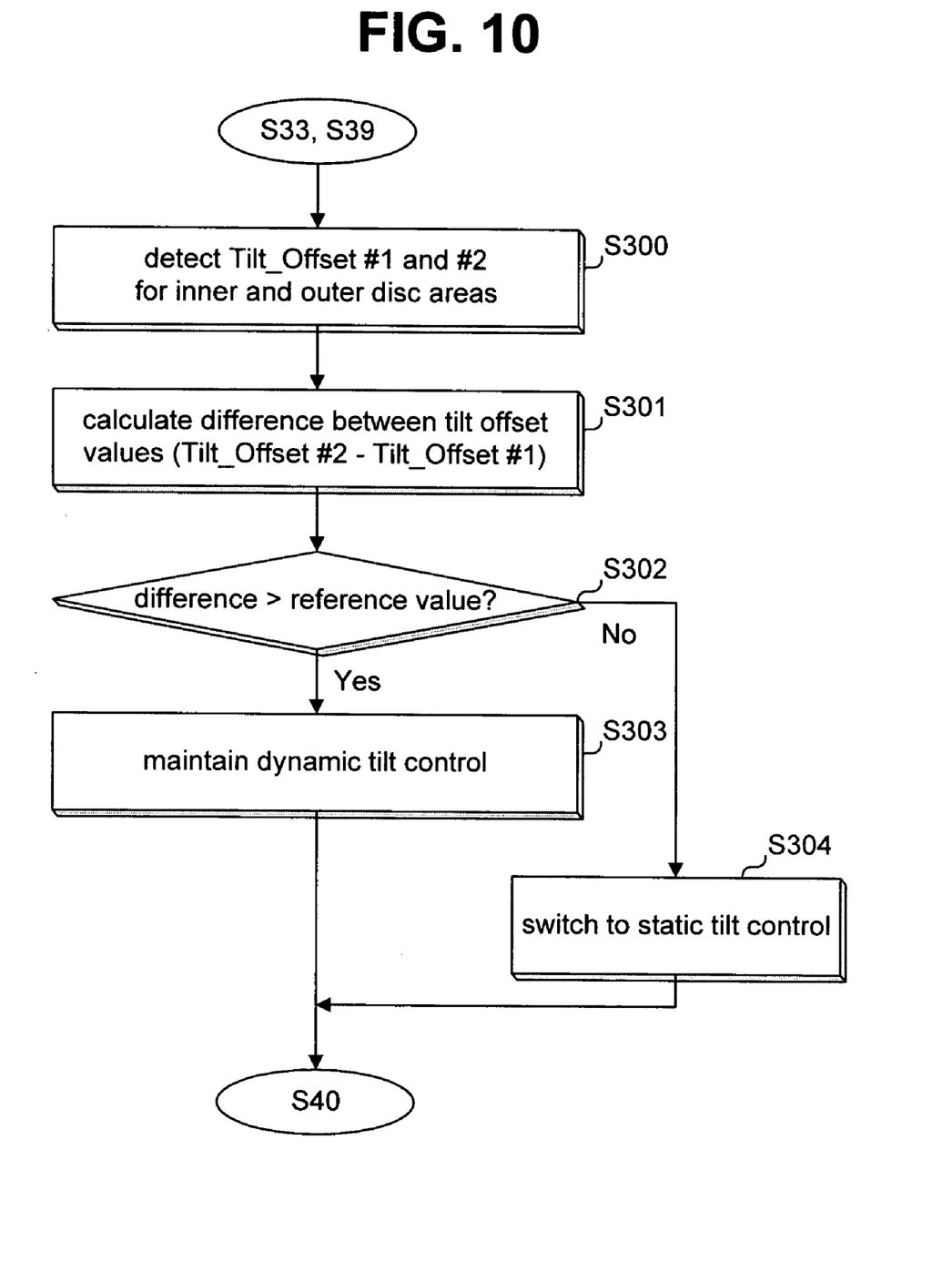
FIG. 10 is a flow chart illustrating exemplary operations where a dynamic tilt control mode is switched to a static tilt control mode based on the difference between tilt offset values detected for different positions.

As shown in FIG. 10, according to another embodiment of the invention when the dynamic tilt control mode is selected, for example, if the loaded optical disc belongs to the CD family that is not subject to defect management (e.g., block S33) or if the loaded optical disc is a DVD-R/RW or a DVD+R/RW and the host does not support defect management (e.g., block S39), the microcomputer 29 can detect an optimal or selected tilt offset values "Tilt_Offset #1" and "Tilt_Offset #2" for the inner and outer peripheral areas of the loaded optical disc before activating the dynamic tilt control mode (block S300).

Figure 11:
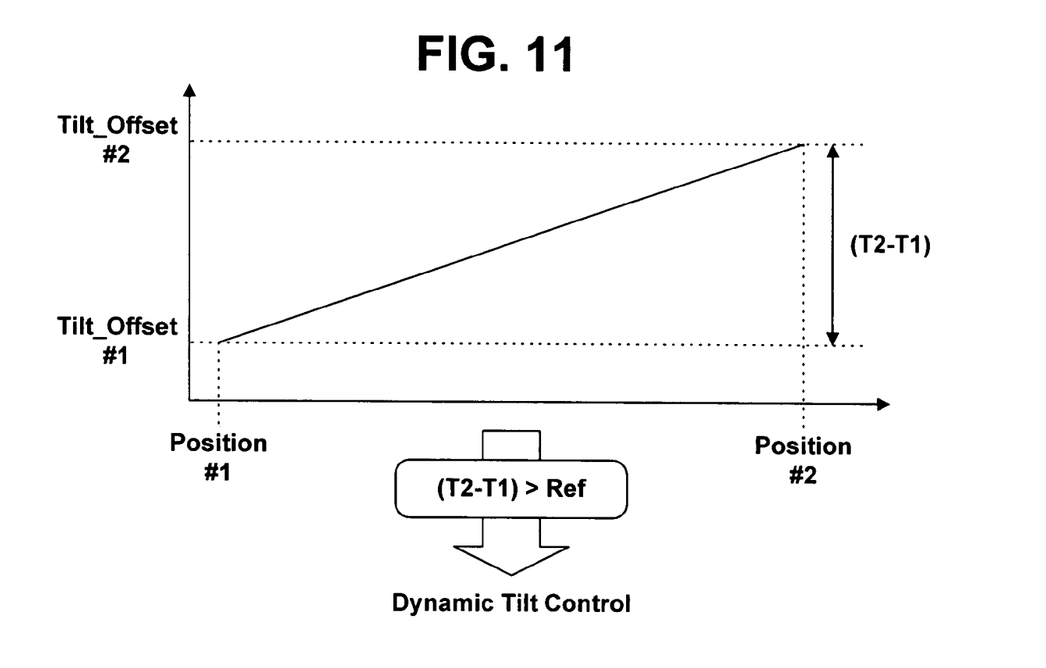
FIG. 11 is a diagram illustrating exemplary conditions where the dynamic tilt control mode is selected if the difference between tilt offset values detected for different positions is larger than a predetermined reference value.
Figure 12:
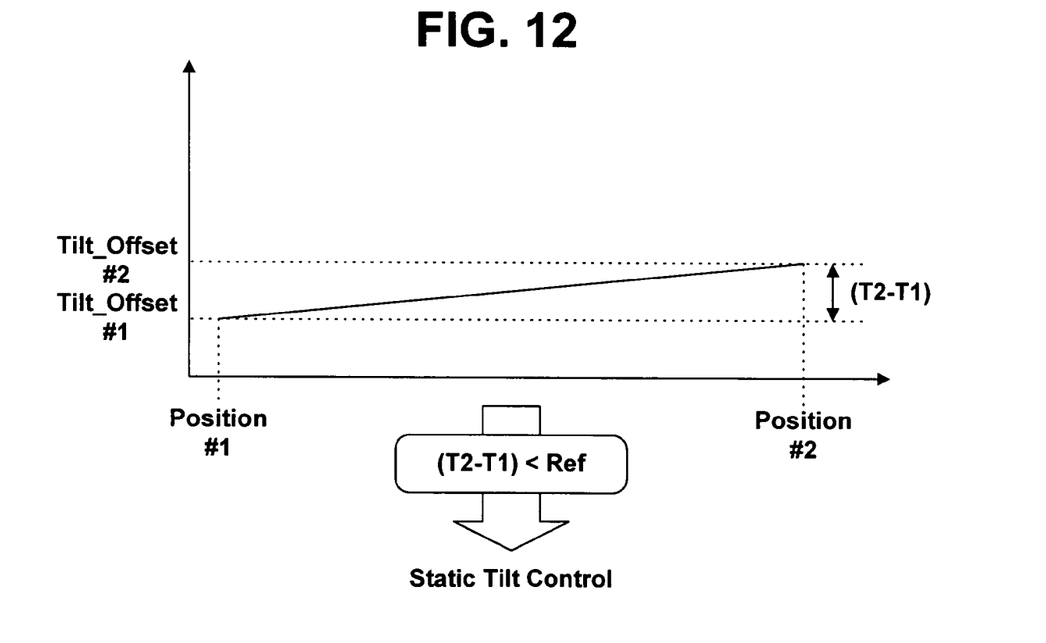
FIG. 12 is a diagram illustrating exemplary conditions where the static tilt control mode is selected if the difference between tilt offset values detected for different positions is smaller than the predetermined reference value.

The microcomputer 29 then can calculate the difference between the detected optimal tilt offset values "Tilt_Offset #1" and "Tilt_Offset #2" (block S301). If the calculated difference is greater than a preset reference value, for example as shown in exemplary FIG. 11 (block S302), the microcomputer 29 can determine that the skew of the loaded optical disc is high, and activate the dynamic tilt control mode (block S303). On the other hand, if the calculated difference is determined to be less than or equal to the preset reference value, for example as shown in exemplary FIG. 12 (block S302), the microcomputer 29 can determine that the skew of the loaded optical disc is low, and activates the static tilt control mode (block S304).

According to one embodiment, when the dynamic tilt control mode is activated during the record mode to increase recording performance for the outer peripheral area of an optical disc having a relatively high skew, the microcomputer 29 can check whether a recording tool executed in the host supports defect management. For example, if the result of the check is that the host supports defect management, the microcomputer 29 can switch the dynamic tilt control mode to the static tilt control mode. Otherwise, if the result of the check is that the host does not support defect management, it maintains the dynamic tilt control mode.

Before activating the dynamic tilt control mode with the record mode set by a recording request of the user, the microcomputer 29 can further compare the difference between the tilt offset values detected for the inner, middle and outer areas of the optical disc with a preset reference value. For example, if the result of the comparison is that the difference is smaller than or equal to the preset reference value, the microcomputer 29 can determine that the skew of the optical disc is low so that performance degradation in the outer peripheral area of the optical disc is tiny, and preferably switch the tilt control mode to the static tilt control mode, otherwise, the microcomputer can maintain the dynamic tilt control mode to decrease variation in the recording performance according to the position of the optical disc.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of an apparatus and method for controlling tilt in an optical disk device have various advantages. For example, embodiments can provide an apparatus and method for controlling tilt in an optical disc device that can perform tilt control optimal for or corresponding to the current operating mode of the optical disc device. Further, even when the optical disc device resumes data recording operation after suspending the recording operation, it can perform tilt control optimal for or corresponding to the current position of an optical pickup of the device. Embodiments can select a suitable tilt control mode according to the type of optical disc and depending on whether a host connected with the device supports defect management. Beneficially, the selection of a suitable tilt control mode can allow maintenance of stable focus and tracking servo operations.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for controlling tilt in an optical disc device, the method comprising:

determining whether a current operating mode of the optical disc device is a play mode or a record mode for storing data on an optical disc inserted in the optical disc device; and selecting a tilt control mode from a first tilt control mode or a second tilt control mode according to the current operating mode, wherein the first tilt control mode is a static tilt control mode which is selected when the current operating mode of the optical disc device is the play mode, and wherein the second tilt control mode is a dynamic tilt control mode which is selected only when the current operating mode of the optical disc device is the record mode, wherein said selecting the tilt control mode further comprises:

activating the dynamic tilt control mode in the record mode;

determining a cause for pausing the record mode using the dynamic tilt control mode; and maintaining the dynamic tilt control mode or switching to a static tilt control mode according to the determined cause, wherein said maintaining the dynamic tilt control mode or switching to the static tilt control mode comprises maintaining the dynamic tilt control mode when the determined cause is at least one of a write buffer under-run state has been entered, a record pause key has been input, or servo failure has been determined.

2. The method of claim 1, wherein the dynamic rift control mode is performed based on different tilt offset values according to positions of the optical disc, and wherein the static tilt control mode is performed based on a fixed tilt offset value.

3. The method of claim 1, further comprising switching from the dynamic tilt control mode to the static tilt control mode when the optical disc is subject to defect management and a host connected to the optical disc device supports the defect management.

4. The method of claim 1, further comprising:
detecting and storing a tilt offset value for a specific position of the optical disc when the optical disc is a read-only optical disc; and
tilting a lens of the optical disc device according to the tilt offset value and the selected tilt control mode.

5. The method of claim 1, further comprising:
detecting tilt offset values for different positions of the optical disc and storing the detected tilt offset values for the different positions in association with corresponding location information when the optical disc is a recordable optical disc; and
tilting a lens of the optical disc device according to the tilt offset values and the selected tilt control mode.

6. The method of claim 5, wherein said detecting the tilt offset values comprises detecting tilt offset values for at least three different positions along a radius of the optical disc.

7. The method of claim 6, wherein a tilt offset value for a certain position between the different positions, for which the tilt offset values are detected and stored, is calculated through an arithmetic operation using the stored tilt offset values.

8. An apparatus for controlling tilt in an optical disc device having a lens, the apparatus comprising:
a controller configured to select a dynamic tilt control mode only when a current operating mode of the optical disc device is a record mode for recording data on an optical disc inserted in the optical disc device and to select a static tilt control mode when the current operating mode of the optical disc device is a play mode; and
a servo unit configured to control tilt of the lens based on the selected tilt control mode, wherein the controller is adapted to detect a write buffer error condition and to suspend data processing while maintaining the dynamic tilt control mode when the write buffer error condition occurs.

9. The apparatus of claim 8, further comprising a storage device, wherein the controller is configured to detect a tilt offset value for a specific position of the optical disc and store the detected tilt offset value in the storage device when the optical disc is a read-only optical disc, wherein the controller is configured to detect tilt offset values for different positions of the optical disc and store the detected tilt offset values for the different positions in the storage device in association with corresponding position information when the optical disc is a recordable optical disc, and wherein the controller calculates and uses a tilt offset value for a certain position between the different positions, for which the tilt offset values are detected and stored, through an arithmetic operation using the stored tilt offset values.

10. The apparatus of claim 8, wherein a host connected to the optical disc device supports defect management and wherein the controller selects the static tilt control mode when the optical disc is subject to the defect management.

11. A method for controlling tilt in an optical disc device, the method comprising:
activating a dynamic tilt control mode only in a record mode for recording data on an optical disc inserted in the optical disc device;
determining a cause for pausing the record mode using the dynamic tilt control mode; and
maintaining the dynamic tilt control mode or switching to a static tilt control mode according to the determined cause, wherein said maintaining the dynamic tilt control mode or switching to the static tilt control mode comprises maintaining the dynamic tilt control mode when the determined cause is at least one of a write buffer under-run state has been entered, a record pause key has been input, or servo failure has been determined.

12. A method for controlling tilt in an optical disc device, the method comprising:
determining whether an optical disc in the optical disc device is subject to defect management; and
selecting a static tilt control mode or a dynamic tilt control mode according to the determination, wherein the static tilt control mode is selected when a host connected to the optical disc device supports the defect management, and the dynamic tilt control mode is selected when the host does not support the defect management, wherein said selecting the static tilt control mode or the dynamic tilt control mode comprises:
selecting the dynamic tilt control mode when the optical disc belongs to the CD family;
selecting the static tilt control mode when the optical disc is one of a DVD-RAM or a recordable blue-ray disc (BD-R/RE) that are subject to the defect management; and
selecting the static tilt control mode or the dynamic tilt control mode according to whether the host supports the defect management, when the optical disc is one of a DVD-R/RW and a DVD+R/RW.

13. A method for controlling tilt in an optical disc device, the method comprising:
determining whether an optical disc in the optical disc device is subject to defect management; and
selecting a static tilt control mode or a dynamic tilt control mode according to the determination, wherein the static tilt control mode is selected when a host connected to the optical disc device supports the defect management, and the dynamic tilt control mode is selected when the host does not support the defect management, wherein said selecting the static tilt control mode or the dynamic tilt control mode comprises selecting the static tilt control mode when the optical disc is one of a DVD-RAM or a recordable blue-ray disc (BD-R/RE) that are subject to the defect management.

14. A method for controlling tilt in an optical disc device, the method comprising:
determining whether an optical disc in the optical disc device is subject to defect management; and
selecting a static tilt control mode or a dynamic tilt control mode according to the determination, wherein the static tilt control mode is selected when a host connected to the optical disc device supports the defect management, and the dynamic tilt control mode is selected when the host does not support the defect management, wherein said selecting the static tilt control mode or the dynamic tilt control mode comprises selecting the static tilt control mode or the dynamic tilt control mode according to whether the host supports the defect management when the optical disc is one of a DVD-R/RW or a DVD+R/RW, and wherein whether the host supports the defect management is determined through interfacing with the host during system startup, or is determined by a command transmitted from the host when a defect occurs.

15. The method of claim 14, wherein selecting the dynamic tilt control mode comprises suspending data processing while maintaining the dynamic tilt control mode when a write buffer error condition occurs.

* * * * *